United States Patent [19]
Fetty

[11] Patent Number: 5,628,594
[45] Date of Patent: May 13, 1997

[54] HORIZONTAL INSERT FOR UNIVERSAL TURRET MILLING MACHINES

[76] Inventor: James R. Fetty, 2425 Highland, Shreveport, La. 71104

[21] Appl. No.: 514,672

[22] Filed: Aug. 14, 1995

[51] Int. Cl.⁶ .................................................. B23C 1/10
[52] U.S. Cl. ...................... 409/144; 409/230; 409/203; 409/213; 409/217
[58] Field of Search .................... 409/144, 230, 409/203, 213, 217, 216

[56] References Cited

U.S. PATENT DOCUMENTS

| | | | |
|---|---|---|---|
| 943,845 | 12/1909 | Porter . | |
| 988,231 | 3/1911 | Vernet . | |
| 1,004,620 | 10/1911 | Berold . | |
| 2,055,783 | 9/1936 | Bennett | 90/11 |
| 2,519,206 | 8/1950 | Van Ausdall | 90/17 |
| 2,604,019 | 7/1952 | Malnar | 409/144 |
| 2,911,885 | 11/1959 | Budney et al. | 90/11 |
| 2,945,402 | 7/1960 | Burg | 77/28 |
| 2,955,515 | 10/1960 | Berthiez | 90/16 |
| 3,163,081 | 12/1964 | Vickers | 90/11 |
| 4,105,361 | 8/1978 | Petroff | 408/130 |
| 4,201,271 | 5/1980 | Evans | 173/476 |
| 4,709,465 | 12/1987 | Lewis et al. | 29/568 |

FOREIGN PATENT DOCUMENTS 665218  9/1938  Germany .

OTHER PUBLICATIONS

YCI, Inc. "Supermax" No 2 Series Milling Machine Catalog.

*Primary Examiner*—M. Rachuba
*Assistant Examiner*—Christopher Kirkman

[57] ABSTRACT

A horizontal insert designed for horizontal insertion in a universal turret milling machine, particularly Bridgeport-type milling machine, to facilitate performance of horizontal milling, drilling, boring and tapping operations, as well as standard vertical machining operations, in one setup. The horizontal insert is characterized by a generally cylindrical quill housing designed for insertion between the bottom column element and top ram element of a Bridgeport-type milling machine or secured to a plate so mounted. In the first embodiment the bottom surface of the quill housing is bolted to the top surface of the column and the upper surface of the quill housing is bolted to the bottom surface of the turret. A quill assembly which terminates in a spindle for mounting milling tools, drill chucks, end mills and the like, is manually or automatically horizontally-extendible from the quill housing and a splined end of the spindle is driven by a motor mounted on a top housing which is mounted to the rear surface of the insert. The reversible spindle is selectively coupled by means of a lever to a gear train located in the quill housing, to transmit torsion from the spindle to a feed pinion gear which advances the quill a selected distance from the quill housing to the workpiece, or retracts the quills from the workpiece into the housing. Alternatively, the spindle can be disengaged from the gear train and the quill advanced from or retracted into the quill housing a selected distance by manually rotating a hand feed wheel on the housing. Forward-reverse and speed control mechanisms are also provided for controlling the direction and speed of rotation of the spindle.

20 Claims, 10 Drawing Sheets

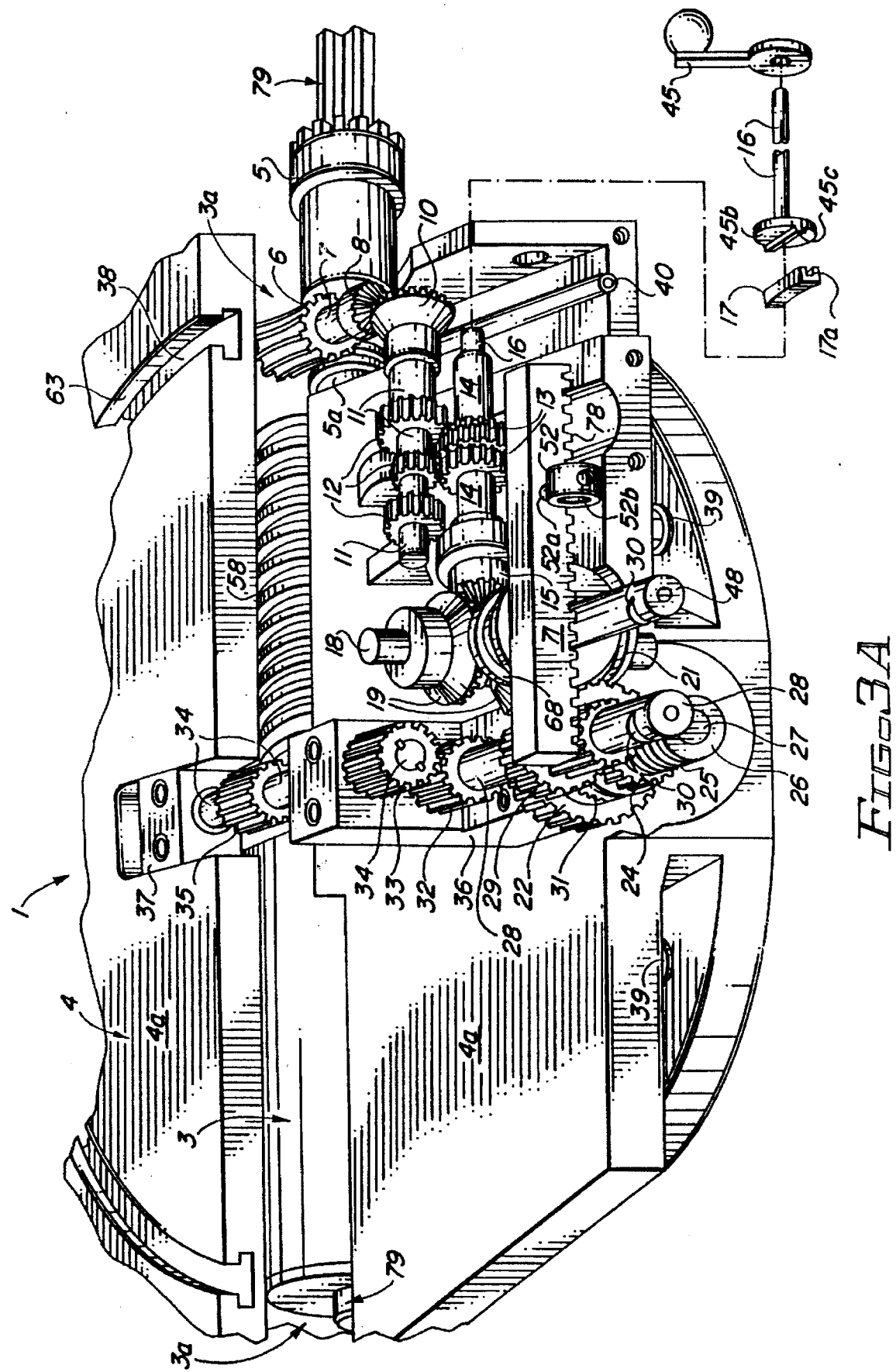

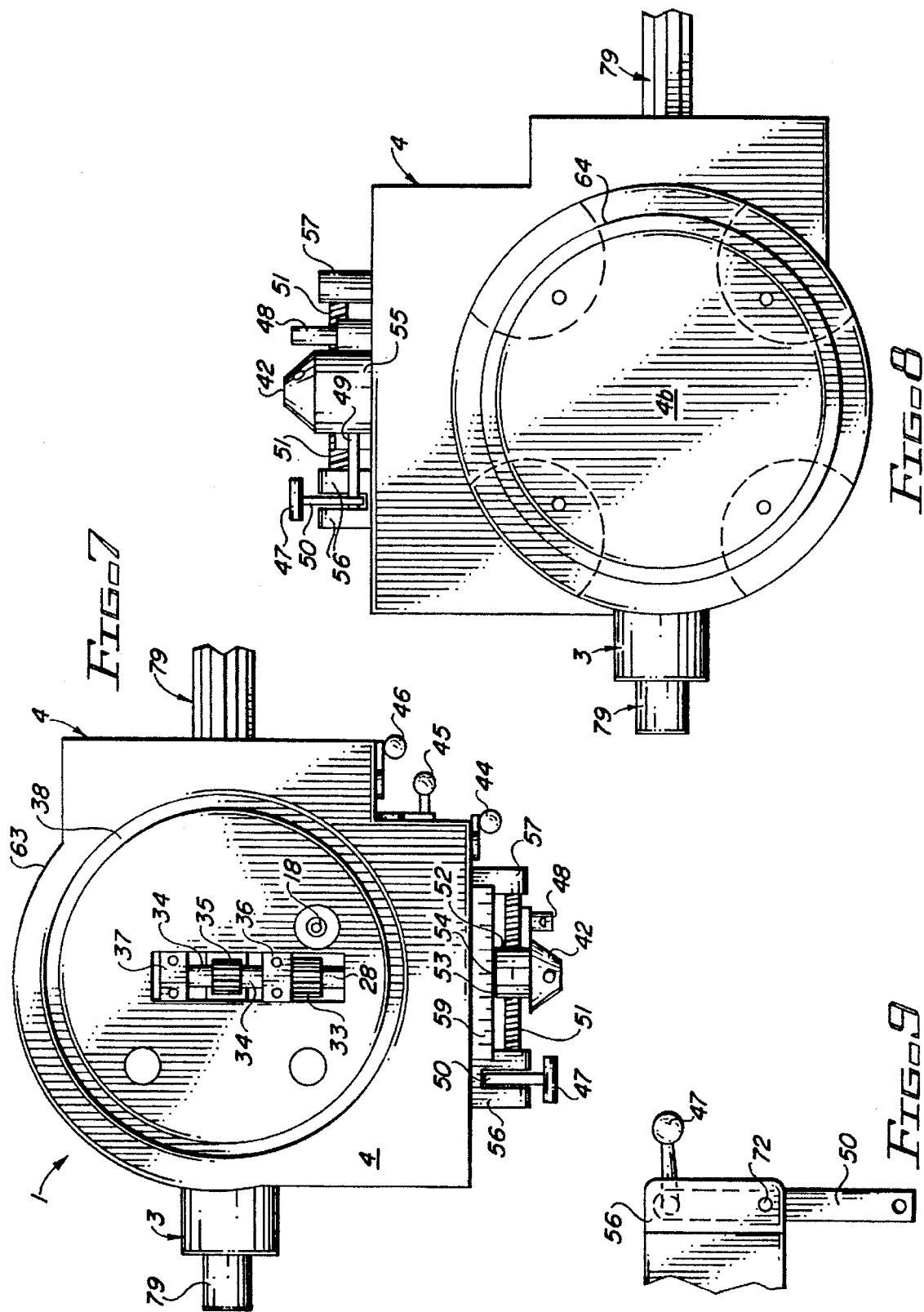

HORIZONTAL INSERT FOR UNIVERSAL TURRET MILLING MACHINES

BACKGROUND OF THE INVENTION

1. Field of the Invention

This invention relates to universal turret milling machines and more particularly, to an insert designed for horizontal insertion in, or mounted on a plate inserted in, a Bridgeport-type milling machine, to facilitate horizontal milling and drilling operations, in addition to conventional vertical machine operation. In a preferred embodiment tire horizontal insert is characterized by a generally cylindrical quill housing, the bottom surface of which is formed with a circular male pilot for insertion in a female pilot provided in the upper surface of the column element of the milling machine. The quill housing is bolted to the upper surface of the column element and the upper surface of the quill housing is shaped with a female pilot and a circular T-slot for receiving T-nuts and bolts which extend through the turret element of the milling machine. A standard or conventional quill assembly is horizontally slidably extendible from a quill bore provided in the quill housing and includes a rotatable spindle on the extendible end for mounting a milling tool or a drill. The splined end of the spindle is engaged by a standard or conventional electric milling machine motor mounted on the rear surface of the quill housing and rotates the spindle and an associated wormed power coupling, responsive to operation of the motor. Manipulation of a power feed control located on the quill housing exterior couples the wormed power coupling to a gear drive which is located in the quill housing and advances the quill assembly a predetermined distance from the quill bore by means of a rack and feed pinion gear. The wormed power coupling can thus be uncoupled from the gear drive train and the quill assembly manually advanced toward the workpiece by rotating a hand feed wheel selectively attached to a course hand feed shaft or a fine hand feed shaft, both of which extend from the quill housing and are each geared to the feed pinion gear. Manipulation of a speed control on the quill housing facilitates powered retraction and extension of the quill assembly into or from the quill bore at a selected speed and the advancing or retracting mode of the quill assembly can be controlled by means of a forward/reverse control. A spring-loaded and axially-shiftable feed stop adjusting screw, having a micrometer nut and a lock nut threadably mounted thereon, is horizontally mounted on the quill housing exterior adjacently parallel to a graduated scale. A toothed quill feed stop rack, mounted horizontally on a feed stop rack pinion gear located inside the quill housing, moves in concert with the quill assembly and is attached to a quill stop knob which extends outside the quill housing and encircles the feed stop adjusting screw. The lock nut and micrometer nut are positioned on the feed stop adjusting screw at a location corresponding to a selected location on the scale, to automatically halt advancement of the quill assembly from the quill bore. When the quill assembly advances a predetermined distance from the quill bore, either automatically by means of the motor or manually, by rotating the hand feed wheel, the quill stop knob extending from the stop rack engages the micrometer nut, causing the feed stop adjusting screw to shift against a spring and disengage a power feed handle provided on the housing which, in turn, disengages a toothed clutch in the gear train and automatically halts advancement of the quill assembly from the quill bore.

A Bridgeport-type universal milling machine is a machining tool commonly used, both in the United States and around the world, to perform a variety of machining operations, including drilling, tapping, reeming, milling and boring. The Bridgeport-type universal milling machine is very popular because it is extremely useful in performing smaller machining jobs, which usually make up the majority of work performed at a typical machine shop during any given year. However, one of the problems associated with conventional Bridgeport milling machines lies in the fact that these milling machines can only be used to perform machining operations in a vertical plane, or 45° with respect to the vertical plane. The horizontal insert of this invention is designed to be inserted horizontally between the bottom column and upper turret portions of a universal turret milling machine, particularly a Bridgeport-type milling machine, or on a plate so inserted, to facilitate performing machining operations on a workpiece in a horizontal plane and at various selected angles with respect to the horizontal plane, in addition to performing machining operations on a workpiece in a vertical plane. In addition, the horizontal insert of this invention is designed to bring the cutting tool mounted on the quill assembly into closer proximity to the workpiece and the rigidity of the machine column, than is presently possible, and will allow heavier cuts and feeds in all machining operations.

2. Description of the Prior Art

Various milling machines and milling machine attachments are known in the art for facilitating various machining operations such as drilling, on a workpiece. U.S. Pat. No. 943,845, dated Dec. 21, 1909, to G. G. Porter and F. E. Cable, details a "Universal Milling Attachment" for use with standard milling machines. The universal milling attachment is characterized by a frame having an arbor rotatably mounted therein and provided at one end with a mechanism to connect it to the spindle of a milling machine. An adjustable member is attached to the frame for securing the frame to the overhanging arm of the milling machine. A tool holder having a driving mechanism is carried by the frame. U.S. Pat. No. 988,231, dated Mar. 28, 1911, to Arthur Vernet, describes a "Multiple Milling Machine", including a turret having a work table with multiple lateral arms connected to the turret and a tool holder carried by each arm. The turret is rotatable relative to the table, to bring any one of the tool holders in operative position with respect to the table. Some of the tool holders are each provided with multiple milling tools and are rotatable independently of the turret to bring any one of the milling tools into operative position. U.S. Pat. No. 1,004,620, dated Oct. 3, 1911, to Charles E. Berold, discloses a "Milling Attachment For Planing Machines". Disclosed is a universal milling head for attachment to the cross rail of a planing machine, such that the milling tools may be presented to the work piece at any desired angle with respect to the horizontal or vertical planes of the planing machine. U.S. Pat. No. 2,055,783, dated Sep. 29, 1936, to Arthur F. Bennett, details a "Machine Tool Structure" including an upright, rigid stand having an abutment, through which a rotatable spindle extends. An attachment is mounted on the abutment for cooperation with the spindle and the upright stand has a second abutment spaced from the first abutment for mounting the attachment in operative position. U.S. Pat. No. 2,519,206, dated Aug. 15, 1950, to Carl Van Ausdall, describes a "Milling Machine Attachment" for use with standard vertical milling machines. The milling machine attachment enlarges the scope of vertical milling machines by converting vertical milling operations such as sawing, slab milling and straddle milling into horizontal milling operations. U.S. Pat. No. 291,885, dated Nov. 10, 1959, to M. P. Budney, et al, discloses a "Milling Adaptor Head" for use with conventional milling machines and enabling milling machines to cut slots or grooves in concave surfaces of hollow objects such as cylinder tubes, rings and the like. U.S. Pat. No. 2,945,402, dated Jul. 19, 1960, to Fred G. Burg, discloses a "Movable Mounting For Machine Tool", which is capable of adequately supporting a heat and complex tool structure, such as a multiple spindle drill. The movable mounting for machine tool is characterized by a support for a rectilinear guide, a tool member provided in the guide for rectilinear movement therein, with the guide including a pair of opposed surfaces, between which the members are movable. A mechanism for clamping and preventing movement of the tool members is provided. U.S. Pat. No. 2,955,515, dated Oct. 11, 1960, to C. W. Berthiez, details "Machine Tools" for enabling a milling machine to effect both horizontal and vertical milling operations. The machine tools are characterized by an auxiliary head which is adapted for connection to the conventional head-stock of a horizontal boring machine. The auxiliary head has a mechanism for rotatably supporting at least one auxiliary horizontal tool spindle provided in the form of a hollow sleeve which coaxially surrounds the conventional boring spindle of the machine. U.S. Pat. No. 3,163,081, dated Dec. 29, 1964, to Stanley E. Vickers, discloses a "Right Angle Milling Head" adapted to be mounted on and powered drilling machines and the like. The milling head greatly increases the utility of drilling units by permitting them to be used for many types of milling operations. U.S. Pat. No. 4,709,465, dated Dec. 1, 1987, to Henry Lewis, et al, describes an "Interchangeable Spindle-Head Milling System", characterized by a master milling head capable of providing spindle driving power and up to a five axis movement to a wide range of individual spindle heads, each designed for a specific machining function and each selectively, interchangeably and automatically matable to the master head.

It is an object of this invention to provide an insert designed for horizontal insertion in a universal turret milling machine to facilitate performance of horizontal milling operations on a workpiece.

Another object of this invention is to provide an insert designed for horizontal insertion between the bottom column element and top turret of a Bridgeport-type milling machine, or on a plate so inserted, with a rotatable spindle to facilitate performance of horizontal milling operations on a workpiece.

Still another object of this invention is to provide a horizontal insert for universal turret milling machines, which insert is characterized by a generally cylindrical quill housing, including a horizontally-extendible quill assembly which is rotated by a motor mounted on the posterior surface of the quill housing and can be selectively advanced from or retracted into the quill housing, either manually or by means of the motor. The insert housing may be mounted between the bottom column element and top turret element of the machine or it may be mounted on a plate so mounted on the machine.

Yet another object of this invention is to provide a horizontal insert for universal turret milling machines, which horizontal insert is characterized by a generally cylindrical quill housing for mounting between the bottom column element and top turret element of a Bridgeport-type turret milling machine or on a plate so mounted, and includes a quill assembly which rotatably receives a spindle for mounting a milling tool and is selectively advanced in concert with the spindle a predetermined distance from a horizontal quill bore provided in the housing, by means of an electric quill drive motor mounted on the housing, or by means of a hand feed wheel provided on the housing.

A still further object of this invention is to provide a horizontal insert for universal turret milling machines, which insert is characterized by a quill assembly that is horizontally-extendible from a quill housing mounted in or on a Bridgeport-type milling machine. A spindle in the quill assembly receives cutting and milling tools and is rotated by splines shaped in one end thereof, powered by a motor mounted on the quill housing and the spindle is selectively coupled to a gear drive train located in the quill housing for advancing the quill assembly a predetermined distance from the quill housing to a workpiece. The quill assembly is selectively uncoupled from the gear drive train by means of a clutch for manually advancing the quill assembly from the quill housing by rotating a hand feed wheel provided on the housing.

Yet another object of this invention is to provide a horizontal insert for mounting between the turret and column of universal turret milling machines, or side-mounted on a plate so attached to the universal turret milling machine, which horizontal insert is characterized by a horizontally-extendible quill assembly that is selectively advanced from or retracted into a quill housing, either manually or by means of a drive motor attached to the housing, the advancement of which quill assembly may be automatically halted after advancing a predetermined distance from the housing, by means of a gear drive train uncoupling mechanism.

SUMMARY OF THE INVENTION

These and other objects of the invention are provided in a horizontal insert for direct or side-mounting on universal turret milling machines, which horizontal insert is characterized by a generally cylindrical quill housing designed for horizontal mounting between the bottom column element and top turret element of a Bridgeport-type universal milling machine or attachment to a plate so mounted. A quill assembly, provided with a rotatable spindle having one end adapted for mounting a milling tool, chuck, drill bit and tap and like tools, is automatically or manually slidably extendible from a horizontal quill bore included in the quill housing and a splined end of the spindle is powered by an electric motor mounted on the quill housing exterior. The spindle is selectively coupled to a gear drive train located in the quill housing for motorized advancement of the quill assembly from the quill bore to the workpiece, or uncoupled by a power engage and disengage control from the gear drive train, to facilitate manual advancement of the quill assembly from the quill bore. Motorized advancement of the quill assembly at a selected speed may be automatically effected by means of a speed control mechanism and in a selected direction by a forward/reverse control. Automatic termination of advancement of the quill assembly after the quill assembly has advanced a predetermined distance from the quill housing is effected by a gear train uncoupling mechanism.

BRIEF DESCRIPTION OF THE DRAWINGS

The invention will be better understood by reference to the accompanying drawings, wherein:

FIG. 3A is an enlarged perspective view, further partially in section, of the horizontal insert illustrated in FIG. 2;

FIG. 7 is a top view of the horizontal insert;

FIG. 8 is a bottom view of the horizontal insert;

FIG. 9 is a side view of the power feed handle element of the horizontal insert illustrated in FIGS. 1A–8;

DESCRIPTION OF THE PREFERRED EMBODIMENTS

Figure 1A:
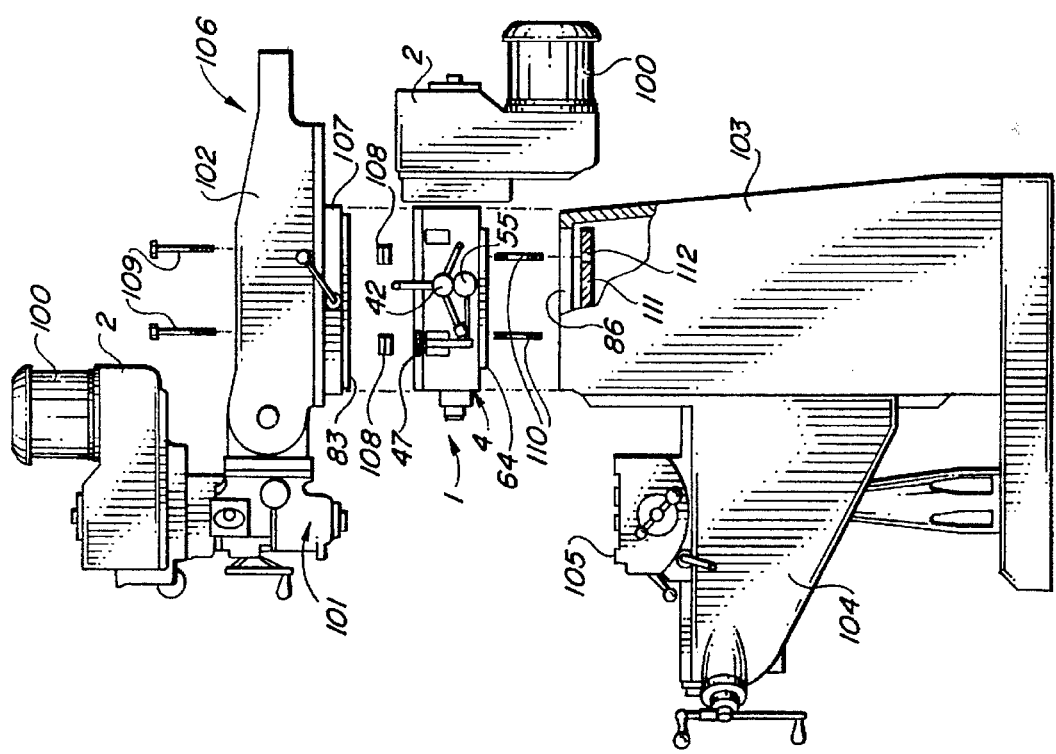
FIG. 1A is a side exploded view of the universal milling machine illustrated in FIG. 1, with the horizontal insert of this invention mounted thereon.
Figure 1:
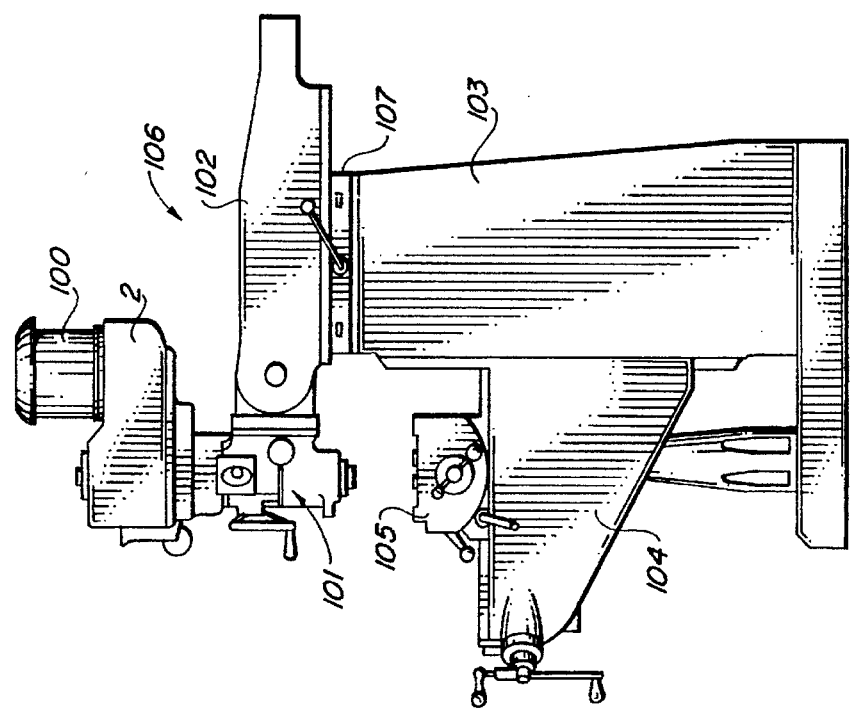
FIG. 1 is a side view of a standard or conventional Bridgeport-type universal milling machine.

Referring initially to FIGS. 1–8 of the drawings, in a preferred embodiment of the invention the horizontal insert for universal turret milling machines, hereinafter referred to as the horizontal insert, of this invention, is generally illustrated by reference numeral 1. The horizontal insert 1 is designed to fit on a universal turret milling machine 106, typically characterized by a vertical base or column 103, a ram 102 mounted on a turret 107, which is mounted on the column 103, a vertical quill housing assembly 101 provided on the front end of the ram 102 and a top housing 2, including an electric motor 100 mounted on the vertical quill housing assembly 101, as illustrated in FIG. 1. A knee 104 extends horizontally from the front surface of the column 103 and a work table 105 is provided on the upper surface of the knee 104.

Figure 2:
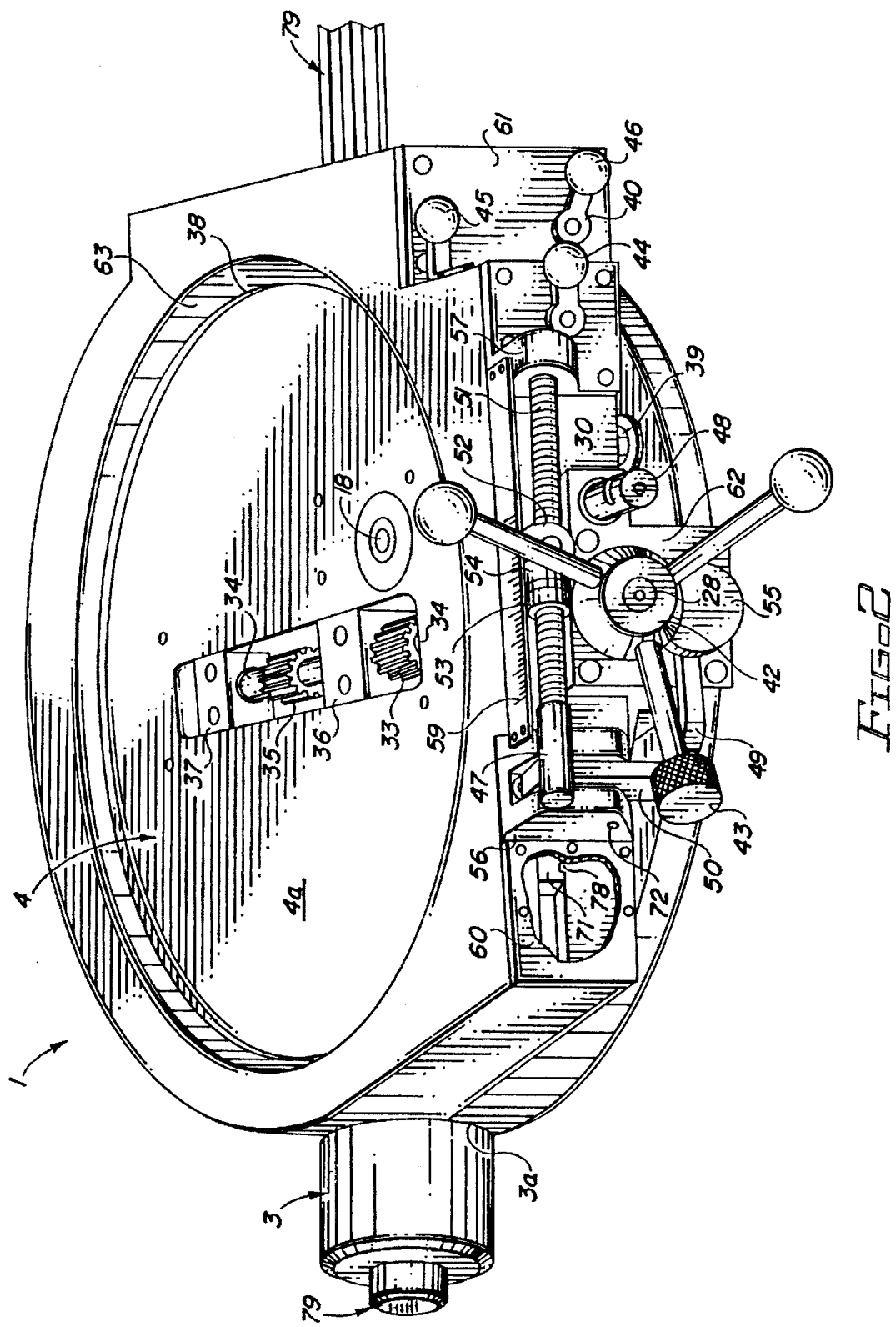
FIG. 2 is a perspective view, partially in section, of a preferred embodiment of the horizontal insert for universal turret milling machines of this invention.
Figure 3:
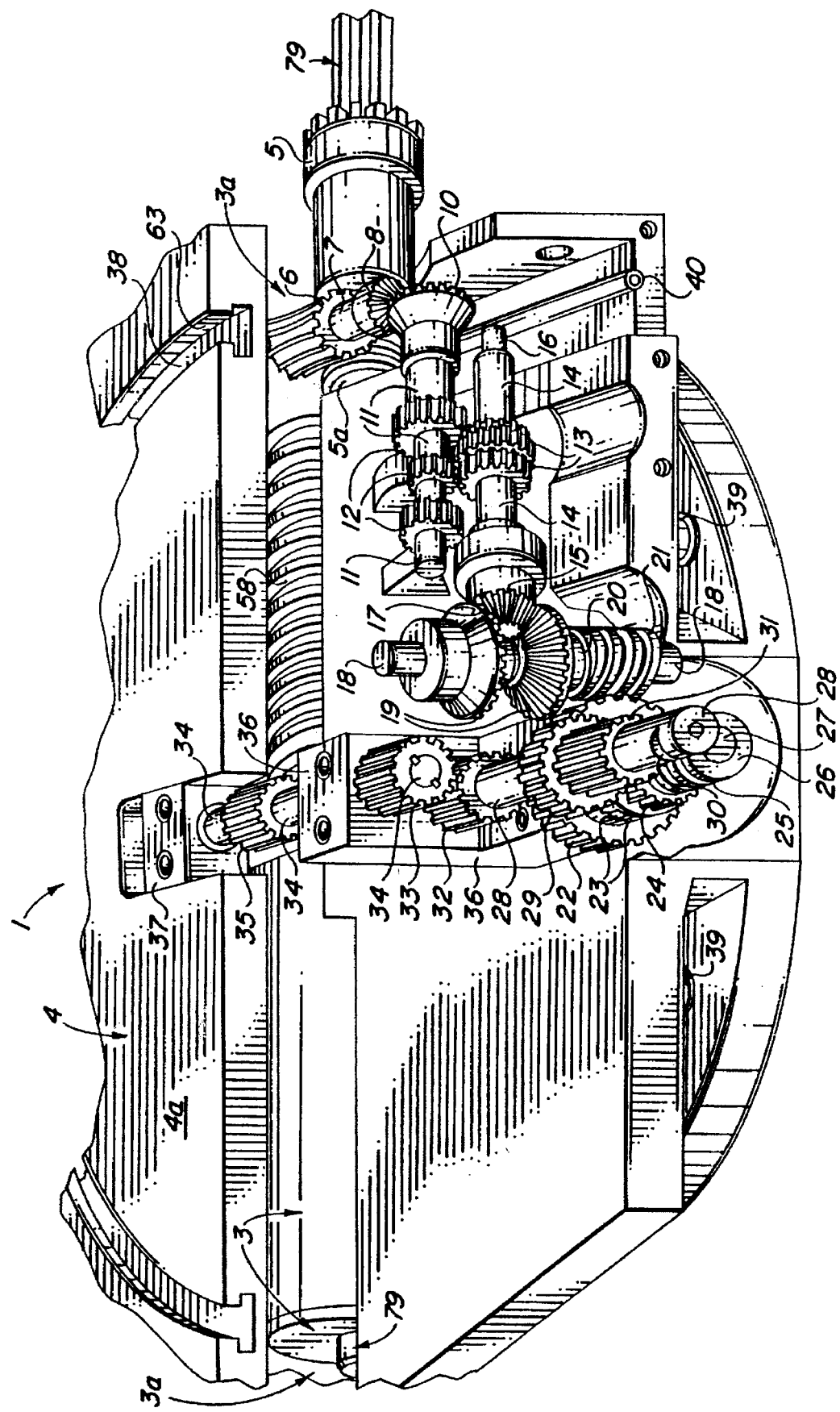
FIG. 3 is an enlarged perspective view, partially in section, of the horizontal insert illustrated in FIG. 2.
Figure 10:
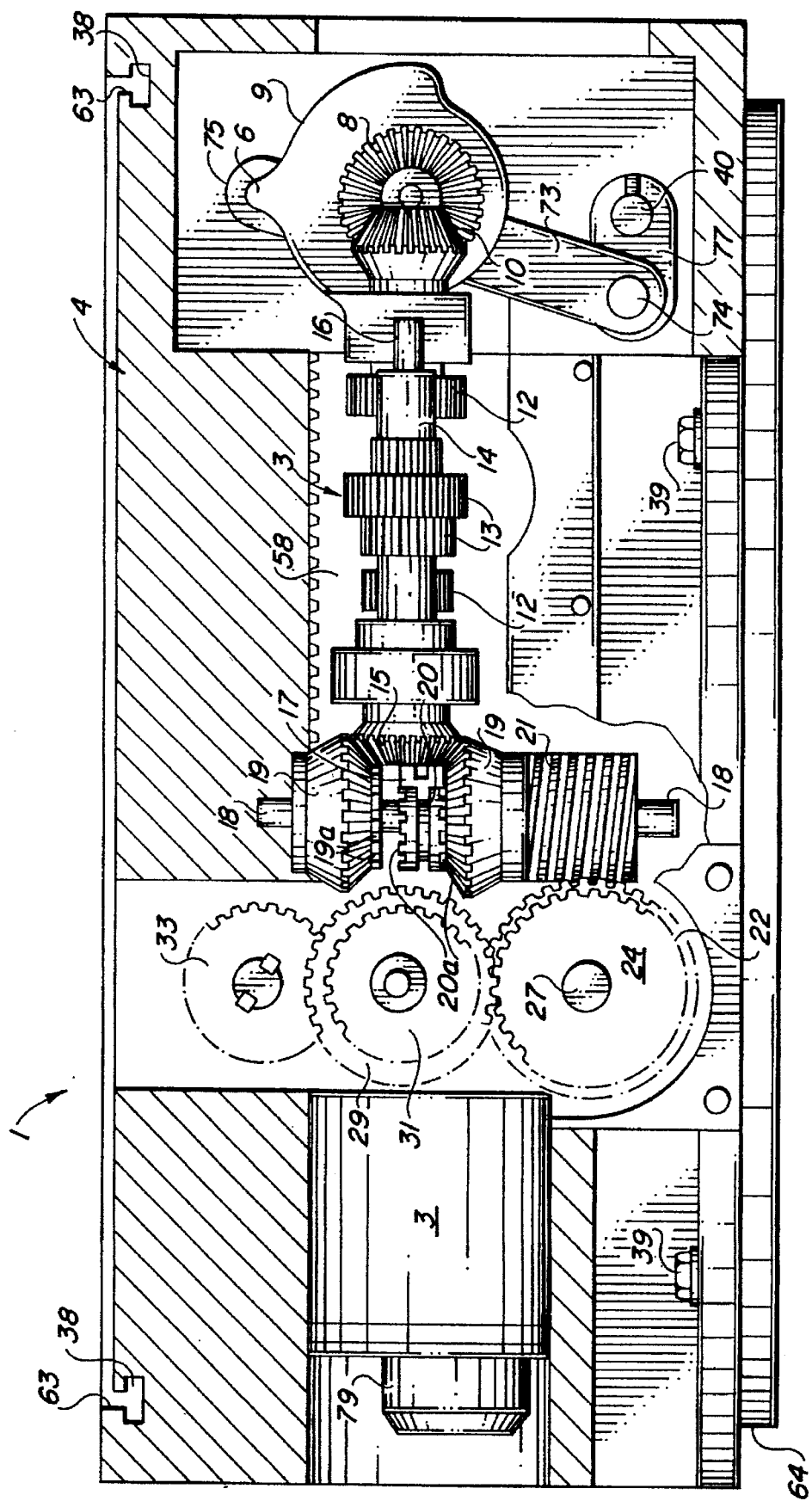
FIG. 10 is a side sectional view of the horizontal insert, more particularly detailing the components of a gear train contained in the horizontal insert housing.
Figure 11:
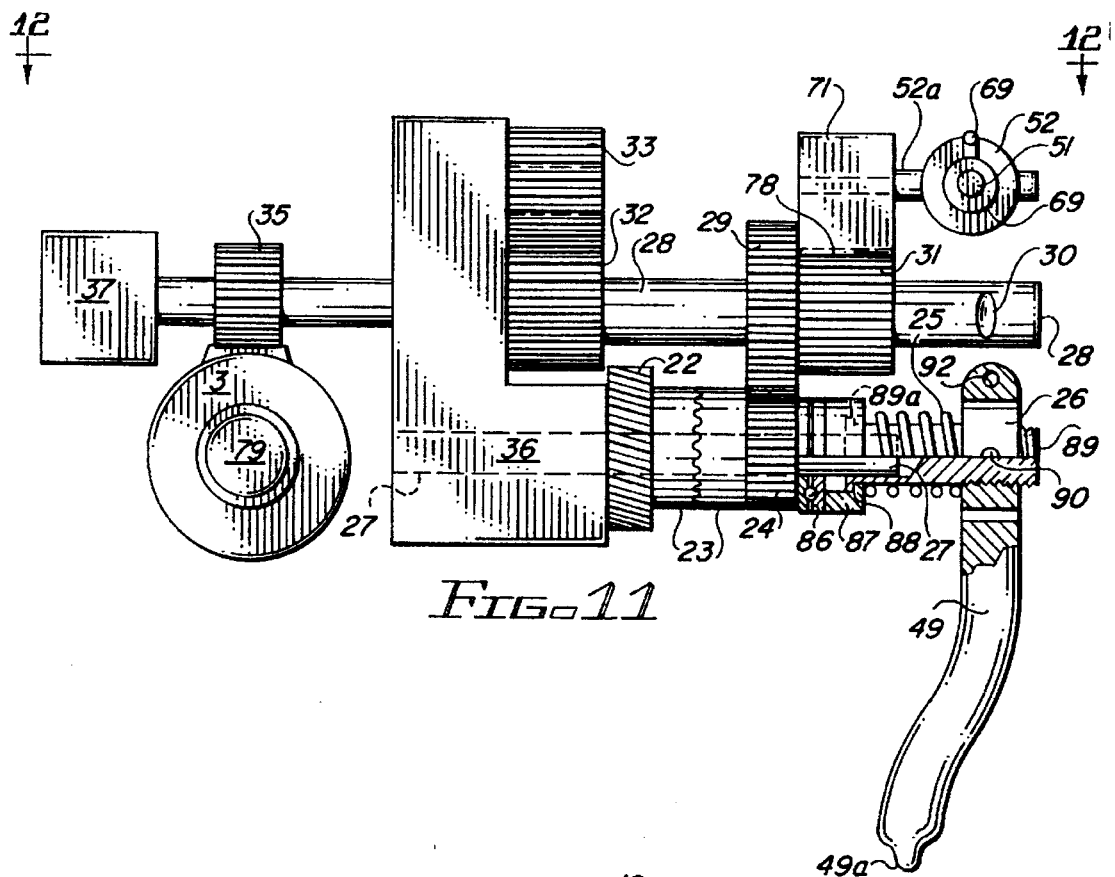
FIG. 11 is a side view of the hand feed gear train of the horizontal insert.
Figure 12:
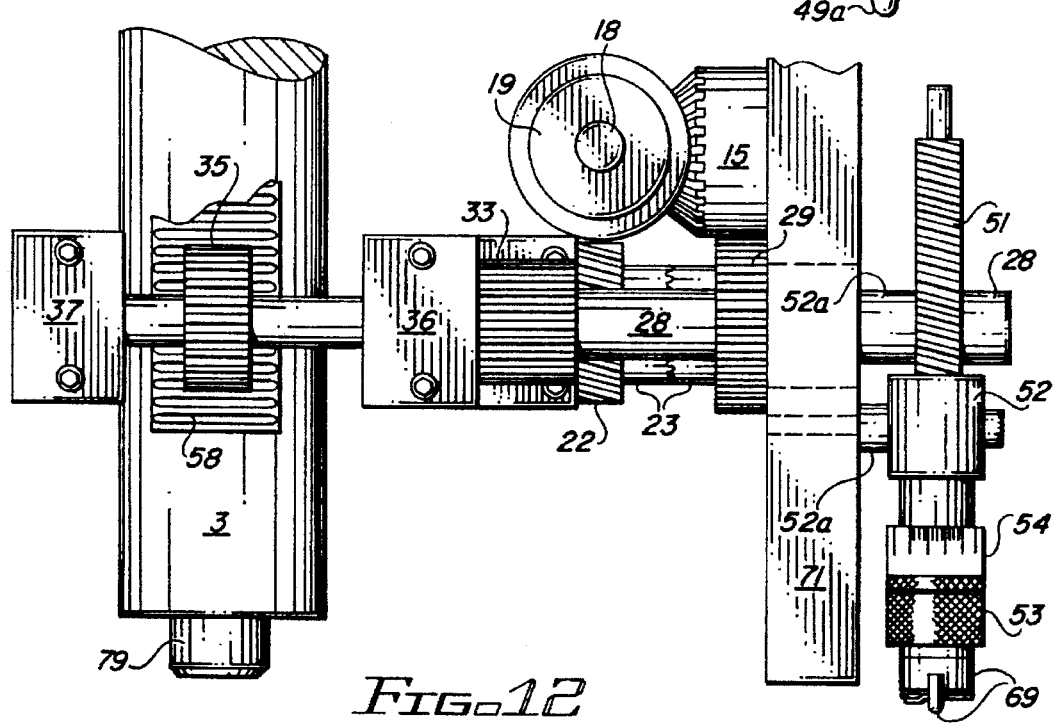
FIG. 12 is a top view of the hand feed gear train illustrated in FIG. 11.

The horizontal insert 1 of this invention is mounted between the turret 107 and column 103 by means of bolts 109 and studs 110, threaded into fixed T-nuts 108, as illustrated in FIG. 1A. The bottom threaded ends of the studs 110 are threaded into a stud seat 112 of a stud mount spider 111. The horizontal insert 1 is characterized by a horizontal quill housing 4, as illustrated in FIGS. 1A–8. As illustrated in FIGS. 2–3A, the flat upper top plate 4a surface of the horizontal quill housing 4 is circumscribed by a circular T-slot 38, aligned vertically with a top female pilot 63, which receives the male turret pilot 83 of the turret 107. Similarly, the flat bottom plate 4b surface of the horizontal quill housing 4 is provided with a bottom male pilot 64, as illustrated in FIG. 8, which seats in a female turret pilot 85 of the column 103. As further illustrated in FIG. 3, a quill cavity 3a extends through the horizontal quill housing 4 between the top plate 4a and bottom plate 4b. A generally elongated, cylindrical quill assembly 3, having a rack 58 machined on the surface thereof, is horizontally slidably accommodated and selectively manually or automatically extendible from and retracted into the quill cavity 3a, as hereinafter described. A conventional spindle 79, extending from the ends of the quill assembly 3, facilitates attachment of a milling tool, drill tap or other tool (not illustrated) at one end thereof. The quill assembly 3 includes a central splined quill cavity (not illustrated) located inside a wormed power coupling 5, which receives a splined end of the spindle 79, protruding from the rear of the horizontal quill housing 4, as illustrated in FIGS. 2 and 3. As further illustrated in FIG. 3, in a preferred embodiment the spindle 79 is encircled by the wormed powered coupling 5 where the spindle 79 exits the horizontal quill housing 4. A swinging worm gear shaft 7 is mounted in a swinging worm gear housing 9 (illustrated in FIG. 5) in the horizontal quill housing 4 in perpendicular relationship with respect to the spindle 79 and a swinging worm gear 6 is mounted on the swinging worm gear shaft 7. The swinging worm gear 6 normally meshes with a power coupling worm 5a on the wormed power coupling 5. The swinging worm gear shaft 7 terminates in a first bevel gear 8, which meshes with a second bevel gear 10, mounted on the end of a cluster gear shaft 11, in turn mounted in the horizontal quill housing 4 in perpendicular relationship with respect to the swinging worm gear shaft 7. A set of three cluster gears 12 is fixed to the cluster gear shaft 11 in spaced relationship with respect to each other and the second bevel gear 10. A sliding cluster gear shaft 14 is mounted in the horizontal quill housing 4 in parallel, adjacent relationship with respect to the cluster gear shaft 11 and terminates in a forward-reverse shift shaft 16, located adjacent to the second bevel gear 10. A pair of adjacent sliding cluster gears 13 of varying size are slidably mounted on the fixed sliding cluster gear shaft 14 for alternatively meshing with the variously sized cluster gears 12, provided on the cluster gear shaft 11, thereby providing 3 rates of rotational speed of the sliding cluster gear shaft 14 by meshing the respective sliding cluster gears 13 with the corresponding cluster gears 12. The sliding cluster gear shaft 14 terminates in a third bevel gear 15, that meshes with vertically-oriented upper and lower forward and reverse bevel gears 19, freely rotatably mounted on a forward-reverse shaft 18, which is mounted vertically in the horizontal quill housing 4 in perpendicular relationship with respect to the horizontal sliding cluster gear shaft 14. As illustrated in FIGS. 3, 3A and 10, a forward-reverse, top and bottom castlelated shift dog 20 is slidably mounted on the forward-reverse shaft 18 between the upper and lower forward and reverse bevel gears 19. A companion forward-reverse, curved shift yoke 17 is provided at the end of the third bevel gear 15 and engages the shift dog 20. Accordingly, the shift dog teeth 20a on the shift dog 20 are shifted into engagement with the shift teeth 19a on the respective forward and reverse bevel gears 19, by rotation of the forward-reverse shift shaft 16, as follows: As illustrated in FIG. 10 the shift dog 20 is slidably keyed to the forward-reverse shaft 18 and selectively engages the shift teeth 19a of the upper forward and reverse bevel gear 19 or the lower forward and reverse bevel gear 19, to drive the upper or lower forward and reverse bevel gears 19, as hereinafter further described. As illustrated in FIGS. 3A and 10, the forward-reverse shift yoke 17 is moved up and down to shift the shift dog 20 by rotation of a shift disc 45b, having a disc pin 45c, engaging a yoke slot 17a in the forward-reverse shift yoke 17. The forward/reverse shift shaft 16 is connected to the shift disc 45b and a forward/reverse feed handle 45 is attached to the forward/reverse shift shaft 16, as further illustrated in FIG. 3A. A worm 21 is mounted on the forward-reverse shaft 18 below the lower, or bottom forward and reverse bevel gear 19 and meshes with a worm gear 22, provided on a worm gear shaft extension 89, mounted for horizontal rotation in the horizontal quill housing 4, as further illustrated in FIGS. 3A and 11. As illustrated in FIGS. 3 and 11, a spring-loaded, toothed clutch, defined by engaged clutch engaging members 23, is also provided on the worm gear shaft extension 89 adjacent to the worm gear 22 and as illustrated in FIG. 3, a first transfer gear 24 is slidably mounted on the worm gear shaft extension 89 adjacent to the toothed clutch 23. Referring again to FIG. 11, one of the clutch engaging members 23 is positioned adjacent and attached to the worm gear 22, fixed to the worm gear shaft 27, while the corresponding clutch member 23 is fixed to the first transfer gear 24, which slides on the worm gear shaft 27. A thrust bearing 86 is located between the rotating transfer gear 24 and a non-rotating shaft mount 87, which is slidably mounted on the worm gear shaft extension 89. A clutch spring 25 is interposed on the worm gear shaft extension 89 between the shaft mount 87 and the spring tension nut 26, threaded on the end of worm gear shaft extension 89. A shaft mount shoulder 88 on the shaft mount 87 engages a corresponding shaft flange 89a on the worm gear shaft extension 89, as further illustrated in FIG. 11. The purpose of the worm gear shaft extension 89, shaft mount 87 and clutch spring 25 is to allow the clutch engaging members 23 to separate in case of an overload in the geared feed system, as hereinafter described. As further illustrated in FIGS. 3, 10 and 11, the first transfer gear 24, slidably mounted on the worm gear shaft 27, normally meshes with a second transfer gear 29, provided on a transfer shaft 28, positioned parallel to the worm gear shaft 27, one end of which transfer shaft 28 is mounted in a transfer shaft bearing block 36, provided in the horizontal quill housing 4, and the other end of which transfer shaft 28 extends through the horizontal quill housing 4, as illustrated in FIGS. 11 and 12. Referring again to FIG. 11, a feed engage yoke 49 is pivotally attached to the spring tension nut 26 by means of a yoke pivot pin 90. The feed engaging yoke 49 is also pivotally attached to the feed-engage cover 55, (illustrated in FIG. 2) by means of a stationary pivot pin 92. This arrangement facilitates pivoting of the feed engage yoke 49, both on the yoke pivot pin 90 and the stationary pivot pin 92, corresponding displacement of the worm gear shaft extension 89 and shaft mount 87 on the worm gear shaft 27 and separation of the toothed clutch engaging members 23, as hereinafter further described.

As further illustrated in FIG. 3 of the drawings, a hand wheel dentation 30 is shaped in the transfer shaft 28 adjacent to the extending end thereof. A feed stop rack pinion gear 31, having a diameter slightly less than that of thee second transfer gear 29, is mounted on the transfer shaft 28 adjacent to the second transfer gear 29. A third transfer gear 32 is also mounted on the transfer shaft 28 adjacent to the transfer shaft bearing block 36 and meshes with a fourth transfer gear 33, provided on a feed pinion gear shaft 34, which extends through the transfer shaft bearing block 36, across the quill cavity 3a and is rotatably mounted in a bearing block 37, mounted in the horizontal quill housing 4. A feed pinion gear 35 is also mounted on the feed pinion gear shaft 34 and meshes with the rack 58, machined on the surface of the quill assembly 3.

Figure 4A:
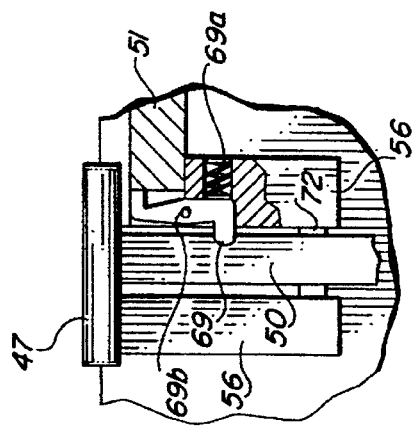
FIG. 4A is an enlarged front view of the power feed handle element of the horizontal insert.
Figure 4:
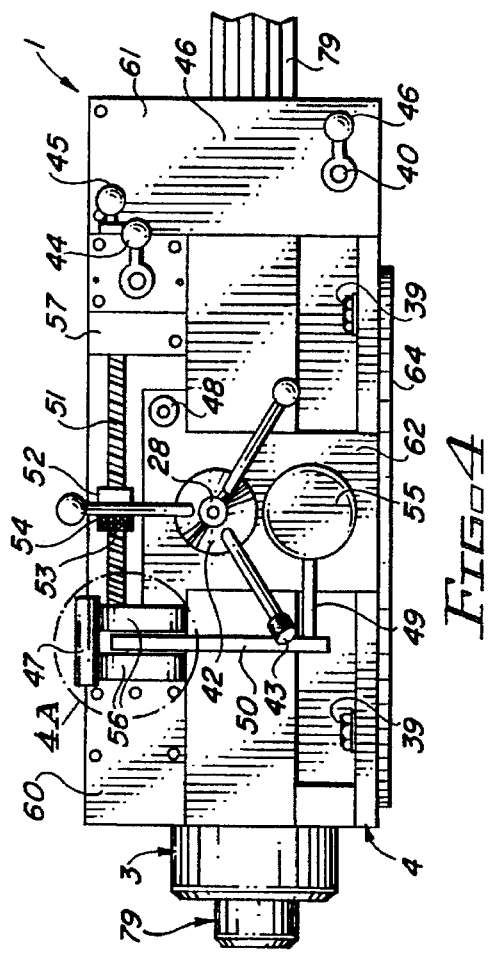
FIG. 4 is a left side view of the horizontal insert illustrated in FIGS. 1A–3A.
Figure 6:
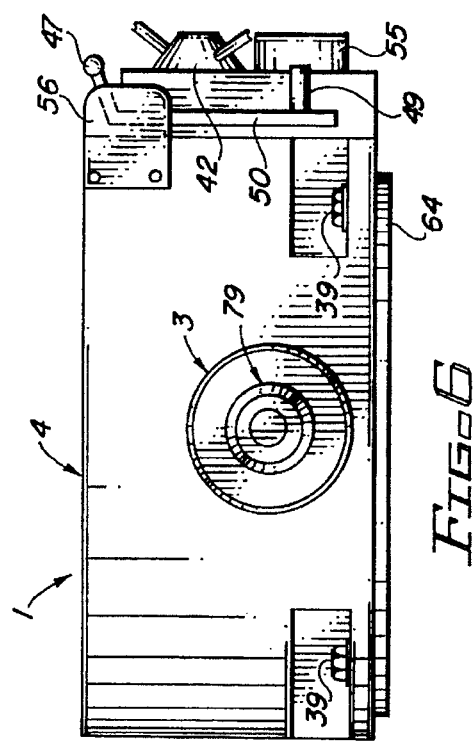
FIG. 6 is a right side view of the horizontal insert.

Referring now to FIGS. 2–13, a threaded feed stop adjusting screw 51 has one end mounted in a first screw socket and cover 56, mounted on the horizontal quill housing 4 and an opposite end mounted in a second screw socket and cover 57, also mounted on the horizontal quill housing 4 in spaced relationship with respect to the first screw socket and cover 56. A micrometer nut 54 and lock nut 53 are threaded on the feed stop adjusting screw 51, as illustrated in FIGS. 2 and 7, and a graduated scale 59 spans the first screw socket and cover 56 and the second screw socket and cover 57, in parallel, adjacent relationship with respect to the feed stop adjusting screw 51. As illustrated in FIGS. 2, 3A and 11–13, a quill feed stop rack 71, having rack teeth 78 (illustrated in FIGS. 2 and 3A) along the bottom edge thereof, is mounted horizontally in the horizontal quill housing 4, with the rack teeth 78 meshing with the feed stop rack pinion gear 31 (mounted on the transverse shaft 28, as illustrated in FIG. 3). A stop knob support 52a extends perpendicularly from the quill feed stop rack 71 and a cylindrical quill stop knob 52, having a stop knob opening 52b, as illustrated in FIG. 3A, is mounted on the stop knob support 52a, and extends from the quill feed stop rack 71, as illustrated in FIGS. 3A and 12. The stop knob opening 52b slidably accommodates the feed stop adjusting screw 51. A feed trip plunger 69, pivotally mounted in the first screw socket and cover 56 by means of a plunger pivot pin 69b, is biased by a plunger spring 69a, into a socket shaped in the feed engage lever 50, as illustrated in FIG. 4A. Accordingly, referring to FIGS. 3A, 4A and 13, the feed stop adjusting screw 51 extends through the stop knob opening 52b of the quill stop knob 52 to facilitate traversal of the quill stop knob 52 with respect to the feed stop adjusting screw 51 responsive to movement of the quill feed stop rack 71. Adjustment of the extent of travel of the quill assembly 3 from the horizontal quill housing 4 by operation of the drive train in the horizontal insert 1 can thus be effected by threadably releasing the lock nut 53 from contact with the adjacent micrometer nut 54 and then threadably repositioning the micrometer nut 54 in a desired location along the length of the feed stop adjusting screw 51 according to the markings on the fixed scale 59. The lock nut 53 is then again tightened against the micrometer nut 54 to allow linear movement of the sliding quill stop knob 52, mounted on the quill feed stop rack 71. Upon contact of the quill stop knob 52 with the fixed and repositioned micrometer nut 54, the feed stop adjusting screw 51 is displaced in the first screw socket and cover 56 and second screw socket and cover 57 against the feed trip plunger 69, illustrated in FIG. 4A, to overcome the bias of the plunger spring 69a and release the feed trip plunger 69 from the feed-engaging lever 50 of the power feed handle 47, disengage the power train and thus prevent further extension of the quill assembly 3 from the horizontal quill housing 4. It will be appreciated that the same disengagement may be effected by manual pivoting of the power feed handle 47 and the feed engaging lever 50 away from the feed trip plunger 69, responsive to grasping and manipulation of the power feed handle 47, extending from the feed engaging lever 50. This action is made possible by a pivot pin 72, which extends through the feed-engaging lever 50, seats in the first screw and socket cover 56 and facilitates pivoting of the feed-engaging lever 50 with respect to the first screw socket and cover 56 by manipulation of the power feed handle 47.

Figure 5:
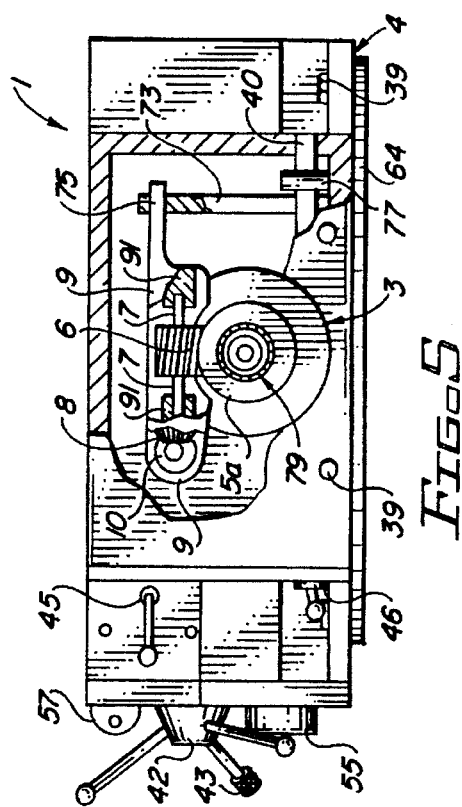
FIG. 5 is a rear view, partially in section, of the power feed handle operating linkage and the horizontal insert.

Referring now to FIGS. 3, 3A, 5 and 10 of the drawings, power may be applied to and disengaged from the first bevel gear 8, second bevel gear 10 and the associated power train inside the horizontal insert 1 by engagement and disengagement of the swinging worm gear 6 with the underlying power coupling worm 5a, mounted on the wormed power coupling 5. This engagement/disengagement is made possible by operation of a swinging worm gear cradle 9, having at one end an upper swing pin 75, pivotally attached to a swing arm 73, as illustrated in FIGS. 5 and 10 and pivoted at the opposite end on the cluster ear shaft 11, (illustrated in FIG. 3A) which mounts the second bevel gear 10. The swing arm 73 is, in turn, pivotally connected to a swing arm link 77 by means of a lower swing pin 74, as illustrated in FIG. 10 and the swing arm link 77 is likewise connected to a swing lever shaft 40. Rotation of the swing lever shaft 40 by means of a feed disengage handle 46 attached thereto as illustrated in FIG. 2, forces the swing arm 73 upwardly to lift the swinging worm cradle 9 and remove the underslung, attached swinging worm gear 6 from engagement with the underlying power coupling worm 5A. Rotation of the feed disengage handle 46 in the opposite direction moves the swing arm link 77 and the swing arm 73 downwardly and lowers the swinging worm gear cradle 9, thus again engaging the swinging worm gear 6 with the underlying power coupling worm 5A.

Figure 13:
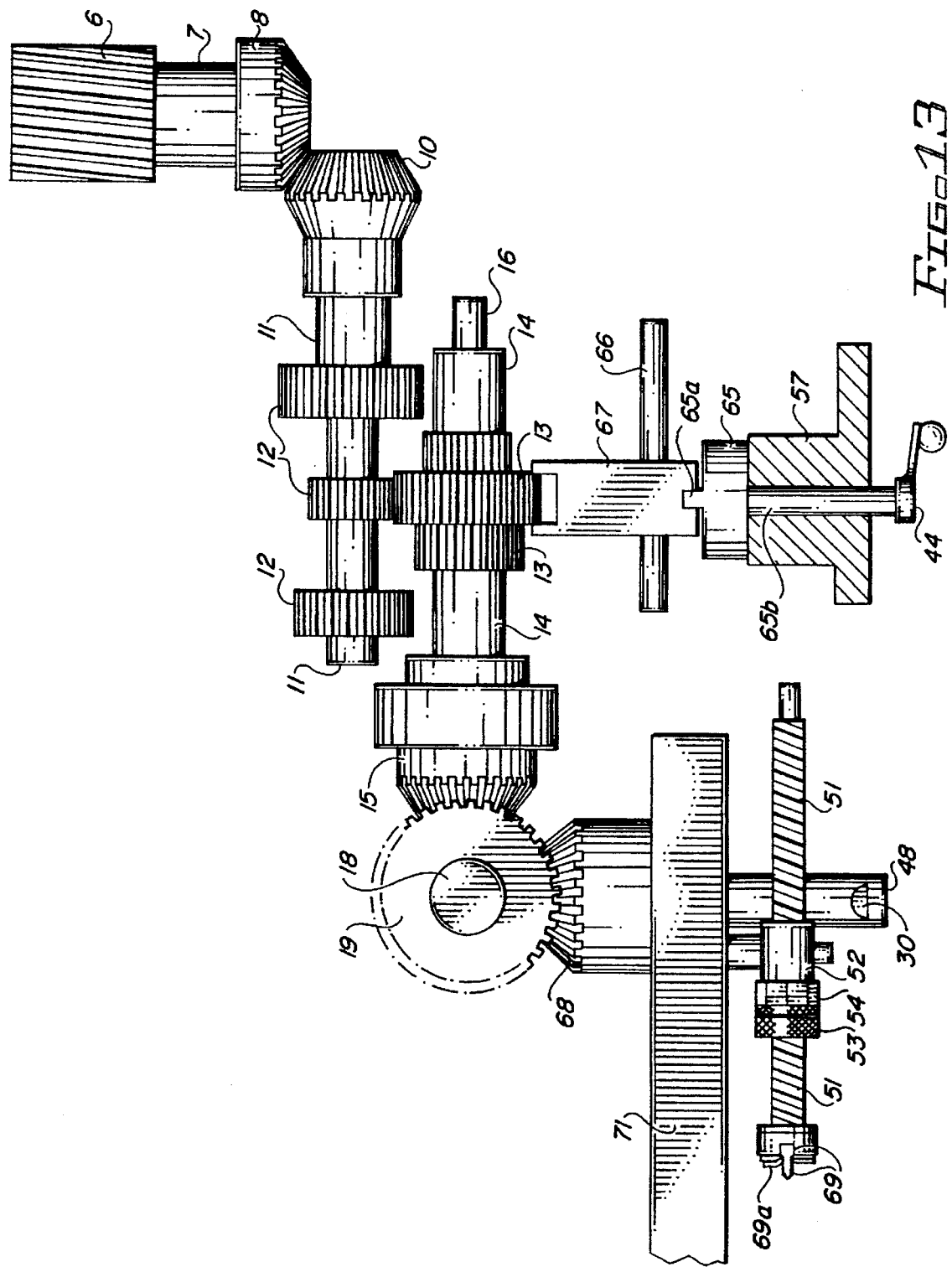
FIG. 13 is a top view of the motorized gear train of the horizontal insert of this invention.

Referring now to FIGS. 2, 3a and 13 of the drawings, the hand feed wheel 42 may be selectively mounted on either the transfer shaft 28 or the fine hand feed shaft 48, both of which are connected to the power train inside the horizontal insert 1, as heretofore described. As illustrated in FIGS. 2 and 3, the hand feed wheel 42 is removably mounted on the transfer shaft 28 and is seated in position by operation of a hand wheel dentation 30, provided in the transfer shaft 28. A corresponding rod (not illustrated) located in the hand feed wheel 42 removably seats in the hand wheel dentation 30 by manipulation of a feed wheel mount knob 43, provided on the hand feed wheel 42, to removably seat the hand feed wheel 42 in position. Accordingly, the hand feed wheel 42 can be utilized to hand feed the quill assembly 3 into and from the horizontal quill housing 4 at a relatively fast rate by rotation of the respective third transfer gear 32 and meshed fourth transfer gear 33, mounted on the feed pinion gear shaft 34, which, in turn, rotates the feed pinion gear 35 that meshes with the corresponding rack 58, machined on the quill assembly 3 as heretofore described. Use of the hand feed wheel 42 with regard to the coarse feed described above is possible only when the toothed clutch engaging members 23 are disengaged as heretofore described. The finer adjustment of the quill assembly 3 into and from the horizontal quill housing 4 can be effected by removing the hand feed wheel 42 from the transfer shaft 28 and replacing it on the fine hand feed shaft 48, also fitted with a hand wheel dentation 30 to receive the hand feed wheel 42. Rotation of the fine hand feed shaft 48 by means of the hand feed wheel 42 thus rotates the hand feed bevel gear 68, mounted on the fine hand feed shaft 48, which hand feed bevel gear 68 engages the top and bottom forward and reverse bevel gear 19 that transmits power to the connected worm 21 and associated worm gear 22, mounted on the worm gear shaft 27. Power is thus transmitted from the first transfer gear 24, also located on the worm gear shaft 27, to the meshing feed stop rack pinion gear 31 mounted on the transfer shaft 28, in order to transmit power to the feed pinion gear 35 in the same manner as described above with respect to the power feed operation. Hand extension and retraction of the quill assembly 3 by use of the hand feed wheel 42 with respect to the fine hand feed shaft 48, is possible only where the swinging worm gear 6 is disengaged, as hereinafter described.

Referring now to FIGS. 2 and 13 of the drawings, the operational speed of the gear train located inside the horizontal insert 1, and thus, the speed of extension and retraction of the quill assembly 3 to and from the horizontal quill housing 4, can be controlled by a feed rate change handle 44, connected to a shift crank shaft 65b, which mounts a shift crank 65, fitted with a crank pin 65a. The crank pin 65a engages a shift shoe 67, which slides on a slide pin 66 and engages the largest of the three sliding cluster gears 13, mounted on the sliding cluster gear shaft 14. Accordingly, manipulation of the feed rate change handle 44 shifts the shift shoe 67 and the sliding cluster gears 13 on the sliding cluster gear shaft 14 into various engagement with the facing cluster gears 12, for speed control of the drive train.

Figure 15:
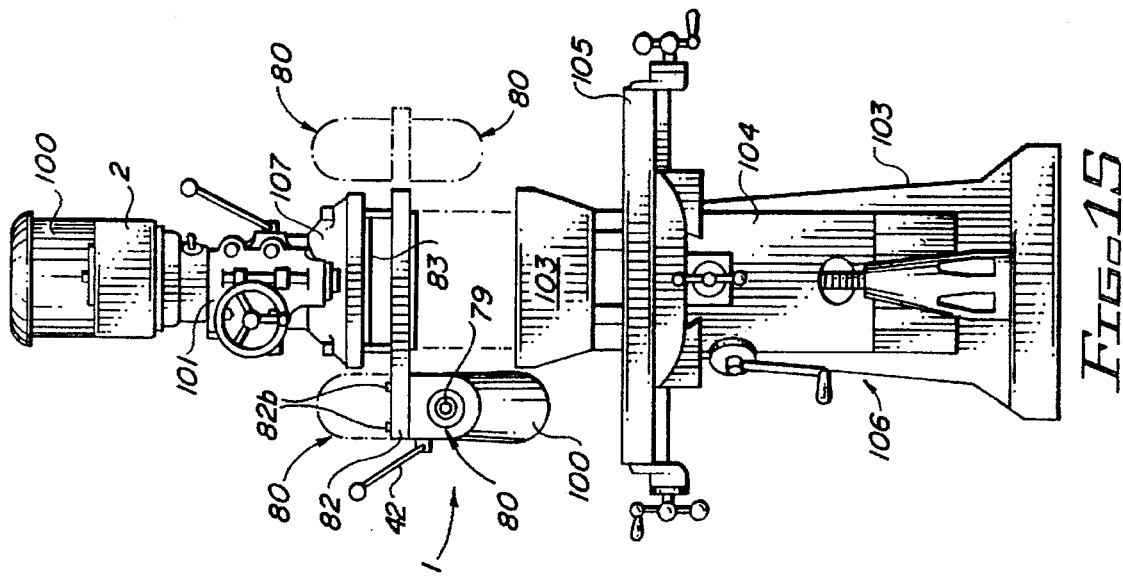
FIG. 15 is a front view of the horizontal milling machine and alternative horizontal insert side-mount illustrated in FIG. 14.
Figure 16:
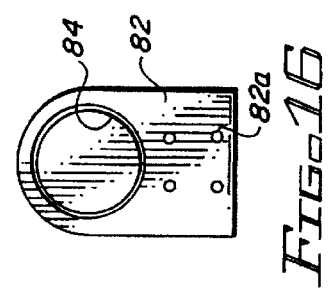
FIG. 16 is a plan view of an assembly mount plate element of the alternative embodiment.
Figure 14:
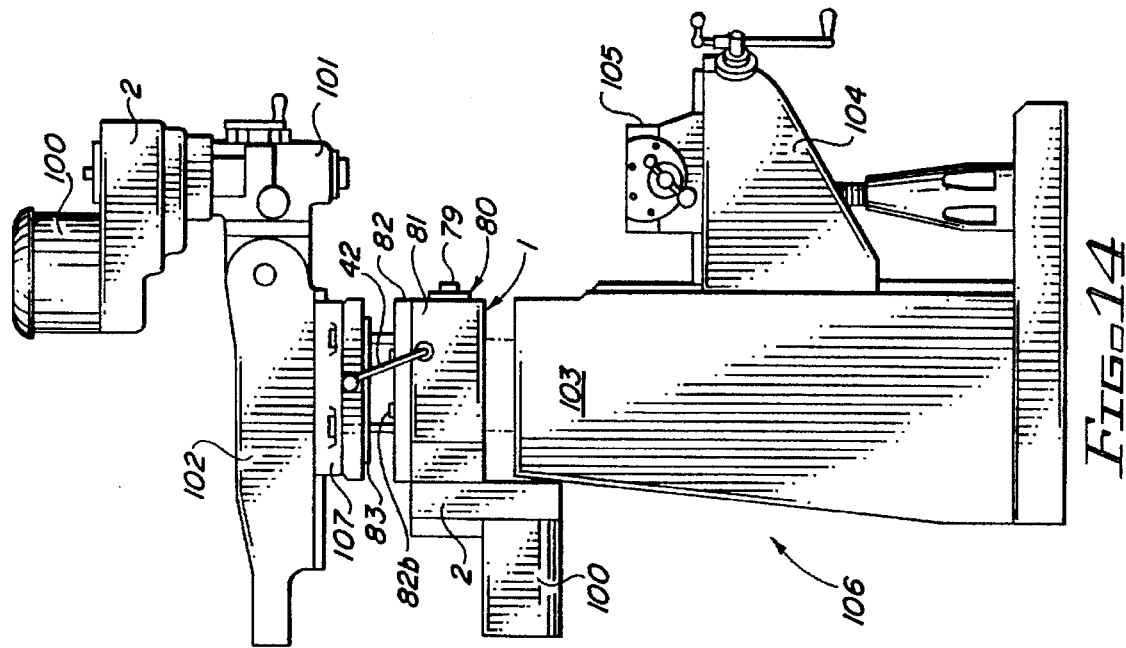
FIG. 14 is a side view of the universal milling machine illustrated in FIG. 1, with an alternative embodiment of the horizontal insert side-mounted thereon.

Referring now to FIGS. 14-16 of the drawings, in an alternative preferred embodiment of the invention a side mount quill assembly 80 is mounted between the turret 107 and the column 103 of the universal turret milling machine 106 in the same manner as the horizontal insert 1 illustrated in FIG. 2. The side mount quill assembly 80 includes a horizontal insert 1 which is characterized by a side mount quill housing 81, bolted or otherwise attached to an assembly mount plate 82 that is sandwiched between the turret 107 and the column 103, as described above. Mount plate openings 82a serve to secure the side mount quill housing 81 to the assembly mount plate 82 by means of plate mount bolts 82b. A pilot opening 84 in the assembly mount plate 82 receives the male turret pilot 83 of the turret 107, as illustrated in FIGS. 14-16 to securely seat the assembly mount plate 82 and thus the attached side mount quill housing 81, to the universal turret milling machine 106. It will be appreciated by those skilled in the art that the electric motor 100 provided in the top housing 2 and bolted to the side mount quill housing 81 may be identical to the corresponding top housing 2 and motor 100 which is mounted on top of the vertical quill housing assembly 101. It will be further appreciated from a consideration of FIG. 15 that the side mount quill assembly 80 may be bolted to the assembly mount plate 82 using the mount plate bolts 82b either on the bottom or top side of the assembly mount plate 82, as illustrated in phantom in FIG. 15. It will be still further appreciated by those skilled in the art that the side mount quill assembly 80 may be identical in construction and have identical features to the horizontal insert 1 illustrated in FIGS. 1-13 or it may be less sophisticated, in that it may be provided with fewer drive train gears and accessories, as desired.

In operation, and referring again to the drawings, the horizontal insert 1 of this invention is used to facilitate horizontal milling, drilling, tapping and other machine operations, as follows. When it is desired to automatically extend the quill assembly 3 from the horizontal quill housing 4 in order to place a cutting tool, bit or other tool in the receiving end of the spindle 79, power is transmitted as hereinafter described from the rotating wormed power coupling 5, connected to the splined end of the spindle 79 and operated by an electric motor 100, located in the corresponding top housing 2. The feed disengage handle 46 is manipulated to pivot the swing arm link 77 and swing arm 73 and drop the swinging worm gear cradle 9 to mesh the attached swinging worm gear 6 with the underlying power coupling worm 5a and transmit power from the wormed power coupling 5 to the power feed system in association with the first bevel gear 8 and second bevel gear 10, as illustrated in FIGS. 5 and 10. This power transmission causes the cluster gear shaft 11 to rotate, along with the three cluster gears 12, which mesh with the corresponding sliding cluster gears 13 in a drive sequence determined by manipulation of the feed rate change handle 44 and adjustment of the sliding cluster gears 13 on the sliding cluster gear shaft 14, as heretofore described with respect to FIG. 13. Power is thus transmitted to the third bevel gear 15, located on the end of the horizontal sliding cluster gear shaft 14. As illustrated in FIG. 3A, the forward-reverse shift shaft 16, attached to the forward-reverse feed handle 45 and extending through the sliding cluster gear shaft 14, is rotated to operate the forward-reverse shift yoke 17 either upwardly or downwardly. This action shifts the forward-reverse reverse shift dog 20 into driving engagement with the shift teeth 19a of either the top or bottom forward and reverse bevel gear 19, to rotate the vertical forward-reverse shaft 18 in a selected direction, as illustrated in FIG. 10. Meshing of the corresponding worm 21, also mounted on the forward-reverse shaft 18, with the adjacent worm gear 22, mounted on the horizontal worm gear shaft 27, effects rotation of the horizontal transfer shaft 28, through meshing of the first transfer gear 24 and the feed stop rack pinion gear 31. This action also drives the horizontal feed pinion gear shaft 34 by interaction between the third transfer gear 32 and the fourth transfer gear 33, to rotate the feed pinion gear 35, which, in turn, interacts with the rack 58 to move the quill assembly 3. Accordingly, the quill assembly 3 will move into or from the horizontal quill housing 4, depending upon the relative position of the forward-reverse shift dog 20 with respect to the top and bottom forward and reverse bevel gears 19. Manual movement of the quill assembly 3 to and from the horizontal quill housing 4 may be effected by initially disengaging the toothed clutch engaging members 23 and positioning the hand feed wheel 42 on the transfer shaft 28 for rapid adjustment of the quill assembly 3, or on the fine hand feed shaft 48 to effect fine extension or retraction of the quill assembly 3, as heretofore described. Accordingly, under circumstances where it is desired to manually move the quill assembly 3, the power feed handle 47 is pulled downwardly to pivot the feed-engaging lever 50 on the pivot pin 72, release the feed trip plunger 69 from the depression in the feed engage lever 50 to separate the toothed clutch engaging members 23 against the bias of the toothed clutch spring 25, which seats against the spring tension nut 26 on the worm gear shaft 27 and thus terminate power to the worm gear shaft 27 and transfer shaft 28. This disengagement of the toothed clutch engaging members 23 thus facilitates manual rotation of the transfer shaft 28 using the removable hand feed wheel 42, as heretofore described. To facilitate use of the fine hand feed shaft 48, the swing worm gear 6 should be disengaged from the power coupling worm 5a and the hand feed wheel 42 should be mounted on the fine hand feed shaft 48.

Under circumstances where it is desired to automatically adjust the speed of extension or retraction of the quill assembly 3 from the horizontal quill housing 4, the feed rate change handle 44 can be manipulated to rotate the corresponding shift crank 65 and shift shoe 67, shift the sliding cluster gears 13 on the sliding cluster gear shaft 14 to reposition the sliding cluster gears 13, which are of varying size, on the sliding cluster gear shaft 14 into engagement with the corresponding cluster gears 12, also of varying size, mounted on the fixed cluster gear shaft 11, as illustrated in FIG. 13 Accordingly, power transferred from the rotating wormed power coupling 5 to the swinging worm gear shaft 7 and corresponding first bevel gear 8 is transferred to the cluster gear shaft 11 means of the second bevel gear 10 and the speed of the corresponding forward-reverse shift shaft 16 can be adjusted with respect to the speed of rotation of the cluster gear shaft ill by shifting the sliding cluster gears 13 on the sliding cluster gear shaft 14 by operation of the feed rate change handle 44, as described above.

Referring again to FIGS. 2, 3a and 4 of the drawings, under circumstances where it is desired to extend the quill assembly 3 a preselected distance from the horizontal quill housing 4 in order to place a tool located in the spindle 79 into a precise position with respect to a workstock, the micrometer nut 54 and lock nut 53 are threadably manipulated on the corresponding threaded feed stop adjusting screw 51, as follows. The lock nut 53 is threadably released from engagement with the micrometer nut 54 and the micrometer nut 54 is threadably adjusted on the feed stop adjusting screw 51 until it is aligned precisely with a selected mark on the fixed adjacent scale 59. The lock nut 53 is then threadably advanced on the feed stop adjusting screw 51 until it again contacts and locks the micrometer nut 54 in position at that desired marking. The power feed handle 47 is then raised into the engaged position to effect operation of the power train, which receives power from the rotating wormed power coupling 5 in the quill-extending direction, as dictated by the relative position of the forward-reverse shift dog 20 with respect to the top and bottom forward and reverse bevel gears 19, as heretofore described. This engaged position of the forward-reverse shift dog 20 is dictated by adjustment of the forward-reverse feed handle 45, as heretofore described. Operation of the side mount quill assembly 80 illustrated in FIGS. 14 and 15 is effected in the same manner as described above with respect to the quill assembly 3.

It will be appreciated by those skilled in the art that the horizontal insert 1 of this invention can be quickly and easily mounted on substantially any Bridgeport-type milling machine, either as illustrated in FIG. 2 or in FIGS. 14 and 15 to facilitate horizontal milling, boring and related operations. The various feed modes, feed rate changes, forward and reverse and feed engaging and disengaging controls are positioned at convenient locations in the horizontal insert 1 and power is derived from a conventional top housing 2 which may be identical to the top housing 2 vertically mounted on the vertical quill housing assembly 101 of the universal turret milling machine 106. The horizontal insert of this invention facilitates a broad-based extension of possible machine functions and may be altered to utilize any combination of the various feed features described above and to fit substantially any universal turret milling machine.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A horizontal insert for a turret milling machine, comprising an insert housing substantially horizontally mounted in the turret milling machine; spindle means journalled for horizontal rotation in said insert housing or receiving and mounting a machining tool; quill means horizontally slidably disposed in said insert housing for rotatably receiving said spindle means; a drive train operably connected to said spindle means and said quill means; quill control means provided in said insert housing, said quill control means operably connected to said drive train for selectively extending and retracting said quill means and said spindle means in concert with respect to said insert housing; and clutch means provided in said drive train for selectively engaging and disengaging said drive train, whereby said quill means and said spindle means in are automatically extended and retracted in concert with respect to said insert housing when said clutch means engages said drive train and said quill means and said spindle means may be manually extended and retracted in concert with respect to said insert housing when said clutch means disengages said drive train.

2. The horizontal insert of claim 1 comprising a hand feed wheel for removably engaging said drive train and manually extending and retracting said quill means and said spindle means in concert with respect to said insert housing, responsive to disengagement of said drive train by said clutch means.

3. The horizontal insert of claim 1 comprising power engage and disengage means provided in said drive train for selectively applying power to said drive train and removing power from said drive train.

4. The horizontal insert of claim 1 comprising:
  (a) a hand feed wheel for removably engaging said drive train and manually extending and retracting said quill means and said spindle means in concert with respect to said insert housing, responsive to disengagement of said drive train by said clutch means; and
  (b) power engage and disengage means provided in said drive train for selectively applying power to said drive train and removing power from said drive train.

5. The horizontal insert of claim 1 comprising forward and reverse means provided in said drive train for selectively controlling forward and reverse rotation of said spindle means in said quill means.

6. The horizontal insert of claim 1 comprising speed control means provided in said drive train for selectively controlling the speed of rotation of said spindle means in said quill means.

7. The horizontal insert of claim 6 comprising power engage and disengage means provided in said drive train for selectively applying power to said drive train and removing power from said drive train.

8. The horizontal insert of claim 6 comprising forward and reverse means provided in said drive train for selectively controlling forward and reverse rotation of said spindle means in said quill means.

9. The horizontal insert of claim 6 comprising:
  (a) power engage and disengage means provided in said drive train for selectively applying power to said drive train and removing power from said drive train; and
  (b) forward and reverse means provided in said drive train for selectively controlling forward and reverse rotation of said spindle means in said quill means.

10. The horizontal insert of claim 9 comprising a hand feed wheel for removably engaging said drive train and manually extending and retracting said quill means and said spindle means in concert with respect to said insert housing, responsive to disengagement of said drive train by said clutch means.

11. A horizontal insert for mounting on a universal turret milling machine having a column and a turret, said horizontal insert comprising a quill housing disposed between the column and the turret of the universal turret milling machine; a quill slidably deployed for horizontal movement in said quill housing; a spindle journalled for rotation in said quill, with one end of said spindle adapted to receive a working tool; drive means mounted on said quill housing, said drive means engaging the opposite end of said spindle from said one end in driving relationship, for rotating said spindle inside said quill; a drive train normally engaging said spindle and said quill; and clutch means provided in said drive train, for selectively engaging and disengaging said drive train, whereby said quill and said spindle are automatically extended and retracted in concert with respect to said quill housing when said clutch means engages said drive train and said quill and said spindle may be manually extended and retracted in concert with respect to said quill housing when said clutch means disengages said drive train, whereby said quill is selectively extended from said quill housing and retracted in said quill housing responsive to operation of said drive means and rotation of said spindle.

12. The horizontal insert of claim 11 comprising a hand feed wheel for removably engaging said drive train and manually extending and retracting said quill and said spindle in concert with respect to said insert housing, responsive to disengagement of said drive train by said clutch means.

13. The horizontal insert of claim 12 comprising power engage and disengage means provided in said drive train for selectively applying power to said drive train and removing power from said drive train.

14. The horizontal insert of claim 13 comprising forward and reverse means provided in said drive train for selectively controlling forward and reverse rotation of said spindle in said quill.

15. The horizontal insert of claim 14 comprising speed control means provided in said drive train for selectively controlling the speed of rotation of said spindle in said quill.

16. A horizontal insert for a turret milling machine, comprising a mount plate substantially horizontally mounted in the turret milling machine; an insert housing carried by said mount plate; quill means horizontally slidably disposed in said insert housing; spindle means journalled for rotation in said quill means for receiving and mounting a machining tool; drive means mounted on said insert housing, said drive means operably engaging said spindle means for rotating said spindle means inside said quill means; a drive train operably connected to said spindle means and said quill means; clutch means provided in said drive train for selectively engaging and disengaging said drive train, whereby said quill means and said spindle means are automatically extended and retracted in concert with respect to said insert housing when said clutch means engages said drive train and said quill means and said spindle means may be manually extended and retracted in concert with respect to said insert housing when said clutch means disengages said drive train; and quill control means provided in said insert housing, said quill control means operably connected to said drive train for selectively extending and retracting said quill means and said spindle means in concert with respect to said insert housing.

17. The horizontal insert of claim 16 comprising a hand feed wheel for removably engaging said drive train and manually extending and retracting said quill means and said spindle means in concert with respect to said insert housing, responsive to disengagement of said drive train by said clutch means.

18. The horizontal insert of claim 17 comprising power engage and disengage means provided in said drive train for selectively applying power to said drive train and removing power from said drive train.

19. The horizontal insert of claim 18 comprising forward and reverse means provided in said drive train for selectively controlling forward and reverse rotation of said spindle means in said quill means.

20. The horizontal insert of claim 19 comprising speed control means provided in said drive train for selectively controlling the speed of rotation of said spindle means in said quill means.

* * * * *